United States Patent
Hanamoto et al.

(10) Patent No.: US 11,795,066 B2
(45) Date of Patent: Oct. 24, 2023

(54) CARBONACEOUS MATERIAL AND METHOD FOR PRODUCING SAME, WATER PURIFICATION FILTER, AND WATER PURIFIER

(71) Applicant: KURARAY CO., LTD., Kurashiki (JP)

(72) Inventors: Tetsuya Hanamoto, Okayama (JP); Mitsunori Hitomi, Okayama (JP); Hiroe Yoshinobu, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 17/798,175

(22) PCT Filed: Jun. 25, 2021

(86) PCT No.: PCT/JP2021/024149
§ 371 (c)(1),
(2) Date: Aug. 8, 2022

(87) PCT Pub. No.: WO2022/004594
PCT Pub. Date: Jan. 6, 2022

(65) Prior Publication Data
US 2023/0122106 A1  Apr. 20, 2023

(30) Foreign Application Priority Data

Jun. 30, 2020 (JP) .................. 2020-112667
Jun. 30, 2020 (JP) .................. 2020-112668

(51) Int. Cl.
*C02F 1/00* (2023.01)
*C01B 32/318* (2017.01)
*C01B 32/354* (2017.01)
*C02F 103/02* (2006.01)

(52) U.S. Cl.
CPC ............. *C02F 1/003* (2013.01); *C01B 32/318* (2017.08); *C01B 32/382* (2017.08); *C01P 2006/12* (2013.01); *C01P 2006/14* (2013.01); *C01P 2006/16* (2013.01); *C02F 2103/02* (2013.01)

(58) Field of Classification Search
CPC ........ C02F 1/003; C02F 2103/02; C02F 1/28; C02F 1/281; C02F 1/283; C02F 2101/36; C01B 32/318; C01B 32/30; C01B 32/336; C01P 2006/12; C01P 2006/14; C01P 2006/16; B01J 20/20; B01J 20/28; B01J 20/2803; G02B 5/285
See application file for complete search history.

(56) References Cited

U.S. PATENT DOCUMENTS

| | | | |
|---|---|---|---|
| 2012/0132578 A1 | 5/2012 | Yoshinobu et al. | |
| 2015/0321187 A1 | 11/2015 | Dias et al. | |
| 2017/0165641 A1 | 6/2017 | Dias et al. | |
| 2017/0209848 A1 | 7/2017 | Takenaka et al. | |
| 2017/0250432 A1 | 8/2017 | Takahashi et al. | |
| 2018/0345251 A1 | 12/2018 | Dias et al. | |
| 2019/0022624 A1 | 1/2019 | Yamanoi et al. | |
| 2019/0291073 A1 | 9/2019 | Hanamoto et al. | |
| 2020/0023340 A1 | 1/2020 | Dias et al. | |
| 2020/0346188 A1 | 11/2020 | Terrian et al. | |
| 2021/0094016 A1 | 4/2021 | Yamanoi et al. | |
| 2021/0261441 A1 | 8/2021 | Nakano et al. | |

FOREIGN PATENT DOCUMENTS

| | | | |
|---|---|---|---|
| CN | 105555714 | A | 5/2016 |
| JP | 2000281325 | A | 10/2000 |
| JP | 2006247527 | A | 9/2006 |
| JP | 2016019980 | A | 2/2016 |
| JP | 2016030697 | A | 3/2016 |
| JP | 5936423 | B2 | 6/2016 |
| TW | 200409729 | A | 6/2004 |
| TW | 201609263 | A | 3/2016 |
| WO | WO-2015152391 | A1 | 10/2015 |
| WO | WO-2016067881 | A1 | 5/2016 |
| WO | WO-2017146044 | A1 | 8/2017 |
| WO | WO-2017199717 | A1 | 11/2017 |
| WO | WO-2018181778 | A1 | 10/2018 |
| WO | WO-2019244903 | A1 | 12/2019 |

OTHER PUBLICATIONS

English translation of the International Preliminary Report on Patentability and Written Opinion dated Jan. 12, 2023 in PCT/JP2021/024149, 5 pages.

International Search Report dated Aug. 24, 2021 in PCT/JP2021/024149, 3 pages.

Written Opinion dated Aug. 24, 2021 in PCT/JP2021/024149 (with English translation), 6 pages.

Kazuhiro Washio, "Surface Properties Analyses by Gas Adsorption and Mercury Intrusion Methods", The Imaging Society of Japan, vol. 46, No. 6, pp. 482-488 (with partial English translation of lines 45-47 on p. 485).

Notice of Opposition dated Nov. 30, 2022 in Japanese Patent No. 7058379 (with partial English translation), 24 pages.

*Primary Examiner* — Dirk R Bass
(74) *Attorney, Agent, or Firm* — Element IP, PLC

(57) ABSTRACT

One aspect of the present invention relates to a carbonaceous material having a BET specific surface area calculated from a nitrogen adsorption isotherm by a BET method, of 750 $m^2/g$ or more and 1000 $m^2/g$ or less, a ratio of a pore volume of pores of 0.3875 to 0.9125 nm calculated from the nitrogen adsorption isotherm by a HK method to a total pore volume calculated from the nitrogen adsorption isotherm by the HK method, of 80% or more, and an average pore diameter obtained by the following formula using the BET specific surface area and the total pore volume calculated from the nitrogen adsorption isotherm by the HK method, of 1.614 nm or less: $D=4000 \times V/S$ (wherein D represents the average pore diameter (nm), V represents the total pore volume (mL/g), and S represents the specific surface area ($m^2/g$)).

9 Claims, No Drawings

US 11,795,066 B2

CARBONACEOUS MATERIAL AND METHOD FOR PRODUCING SAME, WATER PURIFICATION FILTER, AND WATER PURIFIER

TECHNICAL FIELD

The present invention relates to a carbonaceous material. The present invention further relates to a method for producing a carbonaceous material, a water purification filter using the carbonaceous material, and a water purifier.

BACKGROUND ART

In recent years, safety and hygienic concerns have increased with regard to water quality of drinking water, particularly tap water. Removal of harmful substances such as free residual chlorine, trihalomethanes, and musty odors contained in the drinking water is desired. In particular, a slight amount of trihalomethane which is dissolved in the tap water is suspected to be a carcinogenic substance.

The trihalomethane is a general term for compounds in which three of four hydrogen atoms of a methane molecule are substituted with halogens, and representative examples thereof are chloroform, dichlorobromomethane, chlorodibromomethane, and bromoform and the like. As a similar compound, 1,1,1-trichloroethane which is an organohalogen compound in which three of hydrogen atoms of ethane are replaced with chlorine atoms is a substance to be removed by a water purifier.

Various techniques for removing the harmful substances as described above using carbonaceous materials have been proposed. For example, Patent Literature 1 discloses that the removal performance of chloroform and 1,1,1-trichloroethane is enhanced using activated carbon in which the ratio of a pore volume having a predetermined size determined from a specific surface area, an amount of surface oxides, and pore distribution by an MP method and the ratio of a pore volume having a predetermined size determined from pore distribution by a DH method are defined. Patent Literature 2 also reports that trihalomethanes and the like can be adsorbed by an adsorbent containing porous carbon having a predetermined pore volume ratio.

Meanwhile, among the harmful substances described above, the trihalomethanes are difficult to remove. Among them, the chloroform is the most difficult substance to be removed. Therefore, means for more effectively removing the chloroform from the tap water or the like is desired.

In particular, in foreign countries, even in the standards represented by the National Science Foundation (NSF), chloroform removal performance also serves as alternative evaluation for removing other substances. From such a viewpoint, improvement in the chloroform removal performance is actually desired.

However, the conventional activated carbon and porous carbon material as described above do not yet have sufficient chloroform removal performance, and are required to have higher chloroform removal performance.

It has also been found that, even if only chloroform static adsorption performance is simply increased in the carbonaceous material, the carbonaceous material has poor water passing performance, and the life of the carbonaceous material expires when the carbonaceous material is used for applications such as a water purifier.

CITATION LIST

Patent Literature

Patent Literature 1: JP 5,936,423 B2
Patent Literature 2: JP 2006-247527 A

SUMMARY OF INVENTION

An object of the present invention is to provide a carbonaceous material that can exhibit chloroform removal performance superior to conventional ones and has a long life, and a water purifier using the carbonaceous material, and the like.

The present inventors have conducted detailed studies in order to solve the above-described problems. As a result, the present inventors have found that the problems can be solved by a carbonaceous material having the following configuration, and have completed the present invention by further studying based on this finding.

That is, a carbonaceous material according to one aspect of the present invention has a BET specific surface area calculated from a nitrogen adsorption isotherm by a BET method, of 750 m$^2$/g or more and 1000 m$^2$/g or less, a ratio of a pore volume of pores of 0.3875 to 0.9125 nm calculated from the nitrogen adsorption isotherm by a HK method to a total pore volume calculated from the nitrogen adsorption isotherm by the HK method, of 80% or more, and an average pore diameter obtained by the following formula using the BET specific surface area and the total pore volume calculated from the nitrogen adsorption isotherm by the HK method, of 1.614 nm or less:

$$D = 4000 \times V/S$$

wherein D represents the average pore diameter (nm), V represents the total pore volume (mL/g), and S represents the specific surface area (m$^2$/g).

A carbonaceous material according to another aspect of the present invention has a benzene adsorption amount of 20% by weight or more and 28% by weight or less, and an average pore diameter obtained by the following formula using a BET specific surface area calculated by a BET method from a nitrogen adsorption isotherm and a total pore volume calculated by a carbon dioxide gas adsorption DFT method, of 1.300 to 1.600 nm:

$$D = 4000 \times V/S$$

wherein D represents the average pore diameter (nm), V represents the total pore volume (mL/g), and S represents the specific surface area (m$^2$/g).

DESCRIPTION OF EMBODIMENTS

Hereinafter, embodiments according to the present invention will be specifically described, but the present invention is not limited thereto.

[Carbonaceous Material]

<First Embodiment>

A carbonaceous material according to a first embodiment of the present invention has a BET specific surface area calculated from a nitrogen adsorption isotherm by a BET method, of 750 m$^2$/g or more and 1000 m$^2$/g or less, a ratio of a pore volume of pores of 0.3875 to 0.9125 nm calculated from the nitrogen adsorption isotherm by a HK method to a total pore volume calculated from the nitrogen adsorption isotherm by the HK method, of 80% or more, and an average pore diameter obtained by the following formula using the BET specific surface area and the total pore volume calculated from the nitrogen adsorption isotherm by the HK method, of 1.614 nm or less:

$$D = 4000 \times V/S$$

wherein D represents the average pore diameter (nm), V represents the total pore volume (mL/g), and S represents the specific surface area (m$^2$/g).

According to the above configuration, it is possible to provide a carbonaceous material having very excellent chloroform removal performance and a long life. In particular, the carbonaceous material of the present embodiment has a high adsorption rate to chloroform. Normally, when harmful substances are removed with a water purifier or the like, a contact time is short, whereby the carbonaceous material having a higher adsorption rate has higher chloroform removal performance. Therefore, according to the present invention, it is possible to provide a carbonaceous material that can exhibit chloroform removal performance superior to conventional ones and has a long life, and a water purifier using the carbonaceous material, and the like.

(Specific Surface Area)

The carbonaceous material of the present embodiment has a BET specific surface area of 750 m$^2$/g or more and 1000 m$^2$/g or less as calculated by a nitrogen adsorption method. The BET specific surface area within this range provides an advantage that the density of activated carbon particles increases to provide an increased filling amount of the carbonaceous material per volume. The upper limit value of the BET specific surface area is more preferably 980 m$^2$/g or less, still more preferably 970 m$^2$/g or less, and particularly preferably 950 m$^2$/g or less. The lower limit value of the BET specific surface area is 750 m$^2$/g or more, and preferably 800 m$^2$/g or more, from the viewpoint that a certain volume or more contributing to adsorption of chloroform is required.

The specific surface area of the carbonaceous material can be calculated from the nitrogen adsorption isotherm using the BET method, but the measurement of the nitrogen adsorption isotherm and the calculation of the specific surface area can be performed by methods described later in [Measurement of Nitrogen Adsorption Isotherm] and [Measurement of Specific Surface Area].

(Pore Volume)

The carbonaceous material of the present embodiment has a ratio (%) of a pore volume of pores having a pore diameter of 0.3875 to 0.9125 nm calculated by a HK method (also referred to simply as "pore volume of 0.3875 to 0.9125 nm") to a total pore volume calculated by the HK method from the nitrogen adsorption isotherm, of 80% or more. As described above, the ratio of the pore volume of the pores within the above range to the total pore volume is 80% or more, whereby a carbonaceous material having excellent dynamic adsorption of chloroform is obtained.

The ratio is more preferably 80.5% or more, and still more preferably 80.8% or more. The upper limit is not particularly limited, but is preferably 90% or less, and more preferably 85% or less from the viewpoint of diffusibility.

Furthermore, in a preferred embodiment, the carbonaceous material of the present embodiment desirably has a total pore volume calculated by the HK method, of 0.400 mL/g or less. When the total pore volume is within this range, a carbonaceous material having excellent dynamic adsorption of chloroform is obtained.

The upper limit value of the total pore volume is more preferably 0.390 mL/g or less, and still more preferably 0.385 mL/g or less. The lower limit value of the pore volume is not particularly limited, but is preferably 0.320 mL/g or more, and more preferably 0.330 mL/g or more from the viewpoint that a certain volume or more contributing to adsorption of chloroform is required.

In a preferred embodiment, the carbonaceous material of the present embodiment preferably has a pore volume of 0.3875 to 0.9125 nm calculated by the 1-1K method, of 0.250 mL/g or more and 0.350 mL/g or less. Accordingly, it is considered that a carbonaceous material excellent having dynamic adsorption of chloroform can be more reliably obtained.

The lower limit value of the pore volume of 0.3875 to 0.9125 nm is preferably 0.260 mL/g or more, and more preferably 0.270 mL/g or more. Meanwhile, the upper limit value is more preferably 0.340 m L/g or less, and still more preferably 0.320 mL/g or less.

The pore volume and the total pore volume of the carbonaceous material can be calculated from the nitrogen adsorption isotherm using the HK (Horvath Kawazoe) method. The measurement of the nitrogen adsorption isotherm and the calculation of the pore volume and the like can be performed by methods described later in [Measurement of Nitrogen Adsorption Isotherm] and [Measurement of Pore Volume and Total Pore Volume by HK Method].

(Average Pore Diameter)

In the carbonaceous material of the present embodiment, an average pore diameter determined from the specific surface area and the pore volume is 1.614 nm or less. When the average pore diameter is within this range, a carbonaceous material having excellent chloroform removal performance is obtained.

The upper limit value of the average pore diameter is more preferably 1.612 nm or less, and still more preferably 1.610 nm or less. The lower limit value of the average pore diameter is not particularly limited, but is preferably 1.450 nm or more, more preferably 1.510 nm or more, and still more preferably 1.530 nm or more from the viewpoint that pores optimal for adsorption of chloroform are reduced when the average pore diameter is too small.

In the present embodiment, the average pore diameter is obtained by the following formula using the BET specific surface area and the HK method pore volume.

$$D = 4000 \times V/S$$

wherein D represents the average pore diameter (nm), V represents the total pore volume (mL/g), and S represents the specific surface area (m$^2$/g).

Specifically, the average pore diameter of the present embodiment can be performed by methods described later in [Measurement of Nitrogen Adsorption Isotherm] and [Measurement of Average Pore Diameter].

Although the technical significance of each of the specific surface area, the ratio of the pore volume, and the average pore diameter in the present embodiment has been described above, the relationship between the structure of the carbonaceous material (adsorption medium) and an adsorption characteristic for an adsorbent is complicated, and the benzene adsorption amount, the specific surface area, the pore volume, and the average pore diameter may not be directly correlated with the adsorption characteristic for the adsorbent independently. It should be noted that in order to realize a carbonaceous material capable of efficiently removing chloroform, the balance among the specific surface area, the ratio of the pore volume, and the average pore diameter as described above is important.

(Benzene Adsorption Amount)

The benzene adsorption amount is an index indicating the degree of progress of the activation of the carbonaceous material. In order to more efficiently adsorb chloroform, a carbonaceous material having many micropores tends to be suitable. Therefore, it is considered that in the carbonaceous material according to the first embodiment, the benzene adsorption amount is preferably 20% by weight or more and 28% by weight or less, thereby exhibiting more excellent chloroform adsorption performance.

From the viewpoint of achieving excellent chloroform adsorption performance, the benzene adsorption amount of the carbonaceous material is 28% by weight or less. The upper limit value thereof is more preferably 27% by weight or less, and still more preferably 26.5% by weight or less. The lower limit value of the benzene adsorption amount is not particularly limited, but is 20% by weight or more, preferably 21% by weight or more, and more preferably 22% by weight or more from the viewpoint that a certain volume or more contributing to adsorption of chloroform is required.

The benzene adsorption amount of the carbonaceous material can be measured by a method described later in [Measurement of Benzene Adsorption Amount].

<Second Embodiment>

Next, a carbonaceous material according to a second embodiment of the present invention will be described. The carbonaceous material according to the second embodiment of the present invention has a benzene adsorption amount of 20% by weight or more and 28% by weight or less, and an average pore diameter obtained by the following formula using a BET specific surface area calculated by a BET method from a nitrogen adsorption isotherm and a total pore volume calculated by a carbon dioxide gas adsorption DFT method, of 1.300 to 1.600 nm:

$$D=4000\times V/S$$

(wherein D represents the average pore diameter (nm), V represents the total pore volume (mL/g), and S represents the specific surface area (m$^2$/g)).

Also with the above configuration, it is possible to provide a carbonaceous material having very excellent chloroform removal performance and a long life similarly to the first embodiment described above. The carbonaceous material of the present embodiment also has a high adsorption rate with respect to chloroform, and excellent chloroform removal performance.

(Benzene Adsorption Amount)

The carbonaceous material according to the present embodiment has a benzene adsorption amount of 20% by weight or more and 28% by weight or less, thereby having excellent chloroform adsorption performance.

From the viewpoint of achieving excellent chloroform adsorption performance, the benzene adsorption amount of the carbonaceous material is 28% by weight or less. The upper limit value thereof is more preferably 27% by weight or less, and still more preferably 26.5% by weight or less. The lower limit value of the benzene adsorption amount is not particularly limited, but is 20% by weight or more, preferably 21% by weight or more, and more preferably 22% by weight or more from the viewpoint that a certain volume or more contributing to adsorption of chloroform is required.

The benzene adsorption amount of the carbonaceous material can be measured by the same method as in the first embodiment.

(Average Pore Diameter)

The carbonaceous material according to the present embodiment has an average pore diameter of 1.300 to 1.600 nm, the average pore diameter being determined from a BET specific surface area calculated by a BET method from a nitrogen adsorption isotherm and the total pore volume. When the average pore diameter is within this range, a carbonaceous material having excellent chloroform removal performance is obtained.

The upper limit value of the average pore diameter is more preferably 1.590 nm or less, and still more preferably 1.575 nm or less. The lower limit value of the average pore diameter is more preferably 1.340 nm or more, and still more preferably 1.355 nm or more.

In the present embodiment, the average pore diameter is obtained by the formula $D=4000\times V/S$ (wherein D represents the average pore diameter (nm), V represents the total pore volume (mL/g), and S represents the specific surface area (m$^2$/g)) using the BET specific surface area and the DFT total pore volume.

Specifically, the average pore diameter of the present embodiment can be performed by a method described later in [Measurement of Average Pore Diameter].

Although the technical significance of each of the benzene adsorption amount and the average pore diameter in the present embodiment has been described, as in the first embodiment, the relationship between the structure of the carbonaceous material (adsorption medium) and an adsorption characteristic for an adsorbent is complicated, and the benzene adsorption amount and the average pore diameter may not be directly correlated with the adsorption characteristic for the adsorbent independently. It should be noted that in order to realize a carbonaceous material capable of efficiently removing chloroform, the balance between the benzene adsorption amount and the average pore diameter as described above is important.

The carbonaceous material of the second embodiment preferably further has the following characteristics.

(Pore Volume)

The carbonaceous material of the present embodiment preferably has a total pore volume calculated by a carbon dioxide gas adsorption DFT method, of 0.400 mL/g or less. Accordingly, it is considered that a carbonaceous material excellent having dynamic adsorption of chloroform can be more reliably obtained.

In the present embodiment, the total pore volume refers to a pore volume of 0.30 to 1.48 nm obtained by DFT analysis of the carbonaceous material, and the upper limit value thereof is more preferably 0.390 mL/g or less, and still more preferably 0.380 mL/g or less. The lower limit value of the total pore volume is not particularly limited, but is preferably 0.290 mL/g or more, and more preferably 0.300 mL/g or more from the viewpoint that a certain volume or more contributing to adsorption of chloroform is required.

Furthermore, in the carbonaceous material of the present embodiment, the pore volume of pores having a pore diameter of 0.4 to 0.7 nm (also referred to simply as "pore volume of 0.4 to 0.7 nm") calculated by the carbon dioxide gas adsorption DFT method is preferably 0.140 to 0.175 mL/g. The total pore volume and the pore volume of 0.4 to 0.7 nm are considered to be within this range, whereby a carbonaceous material having excellent dynamic adsorption of chloroform can be more reliably obtained.

The upper limit value of the pore volume (0.4 to 0.7 nm) is more preferably 0.170 mL/g or less, and still more preferably 0.167 mL/g or less. Meanwhile, the lower limit value thereof is more preferably 0.145 mL/g or more, and still more preferably 0.150 mL/g or more.

Furthermore, in the carbonaceous material of the present embodiment, the ratio of the pore volume of 0.4 to 0.7 nm to the total pore volume is preferably 0.535 or less. The ratio is more preferably 0.533 or less, and still more preferably 0.530 or less. The lower limit is not particularly limited, but is preferably 0.400 or more, and more preferably 0.410 or more from the viewpoint of adsorption capacity.

Here, the total pore volume means the total pore volume described above, and the ratio of the pore volume to the total pore volume can be calculated by the pore volume of 0.4 to 0.7 nm/the total pore volume.

In the present embodiment, the total pore volume and the pore volume of the carbonaceous material can be calculated by a carbon dioxide gas adsorption DFT method, that is, by analyzing a carbon dioxide adsorption/desorption isotherm by an NLDFT method. The measurement of the carbon dioxide adsorption/desorption isotherm and the calculation of the total pore volume and the pore volume can be performed by methods described later in [Measurement of Carbon Dioxide Adsorption/Desorption Isotherm] and [Measurement of Total Pore Volume and Pore Volume by DFT Method].

(Specific Surface Area)

Furthermore, the carbonaceous material of the present embodiment preferably has a BET specific surface area of 1000 $m^2/g$ or less as calculated by a nitrogen adsorption method. The BET specific surface area within this range provides an advantage that the density of activated carbon particles increases to provide an increased filling amount of the carbonaceous material per volume. The upper limit value of the BET specific surface area is more preferably 980 $m^2/g$ or less, still more preferably 970 $m^2/g$ or less, and particularly preferably 950 $m^2/g$ or less. The lower limit value of the BET specific surface area is not particularly limited, but is preferably 750 $m^2/g$ or more, and more preferably 800 $m^2/g$ or more from the viewpoint that a certain volume or more contributing to adsorption of chloroform is required.

The specific surface area of the carbonaceous material can be determined by the same method as in the first embodiment.

Furthermore, both the carbonaceous material of the first embodiment and the carbonaceous material of the second embodiment preferably have the following characteristics in addition to the characteristics described above.

(Pore Volume by MP Method)

The carbonaceous material of the present embodiment preferably has a total pore volume measured by an MP method, of 0.250 mL/g or more and 0.600 mL/g or less. This provides an advantage that pores optimal for adsorption of chloroform are formed.

The upper limit value of the total pore volume measured by the MP method is more preferably 0.500 mL/g or less, and still more preferably 0.450 mL/g or less. The lower limit value thereof is more preferably 0.300 mL/g or more, and still more preferably 0.350 mL/g or more.

Furthermore, the carbonaceous material of the present embodiment preferably has a pore volume of 0.6 nm or less measured by the MP method, of 0.100 mL/g or more and 0.250 mL/g or less. This has an advantage that pores that do not contribute to adsorption of chloroform can be reduced.

The upper limit value of the pore volume of 0.6 nm or less measured by the MP method is more preferably 0.200 mL/g or less, and still more preferably 0.190 mL/g or less. The lower limit value thereof is more preferably 0.150 mL/g or more, and still more preferably 0.160 mL/g or more.

In the carbonaceous material of the present embodiment, a ratio (%) of a pore volume of 0.6 nm or less by the MP method to a total pore volume by the MP method is preferably 35% or more and 55% or less. The upper limit value of the ratio is more preferably 50% or less, and still more preferably 48% or less. The lower limit value thereof is more preferably 40% or more, and still more preferably 44% or more.

Here, the ratio (%) of the pore volume to the total pore volume can be calculated by "pore volume of 0.6 nm or less by MP method"/"total pore volume by MP method"×100.

In the present embodiment, the total pore volume and the pore volume of the carbonaceous material by the MP method can be calculated from the nitrogen adsorption isotherm using the MP (Micropore analysis) method. The specific calculation of the total pore volume and the pore volume can be performed by a method described later in [Measurement of Total Pore Volume and Pore Volume by MP Method].

(Pore Volume by DH Method)

In the carbonaceous material of the present embodiment, the total pore volume of 1 to 100 nm measured by a DH method is preferably 0.070 mL/g or more and 0.180 mL/g or less. This provides an advantage that molecular diffusibility in the pores that affects adsorption of chloroform is improved. The "total pore volume of 1 to 100 nm" refers to a pore volume of a pore diameter of 1 nm to 100 nm, which can be measured by a method described later in [Measurement of Total Pore Volume and Pore Volume by DH Method].

The upper limit value of the total pore volume is more preferably 0.150 mL/g or less, and still more preferably 0.140 mL/g or less. The lower limit value thereof is more preferably 0.080 mL/g or more, and preferably 0.090 mL/g or more.

Furthermore, the carbonaceous material of the present embodiment preferably has a pore volume of 2 nm or less measured by the DH method, of 0.040 mL/g or more and 0.120 mL/g or less. This provides an advantage that the balance between the diffusibility and the adsorption performance of chloroform is improved.

The upper limit value of the pore volume of 2 nm or less by the DH method is preferably 0.100 mL/g or less, and more preferably 0.090 mL/g or less. The lower limit value thereof is more preferably 0.050 mL/g or more, and still more preferably 0.060 mL/g or more.

In the carbonaceous material of the present embodiment, the ratio (%) of the pore volume of 2 nm or less by the DH method to the total pore volume of 1 to 100 nm by the DH method is preferably 30% or more and 90% or less. The upper limit value of the ratio is more preferably 80% or less, and still more preferably 70% or less. The lower limit value thereof is more preferably 35% or more, and still more preferably 40% or more.

Here, the ratio (%) of the pore volume to the total pore volume can be calculated by "pore volume of 2 nm or less by DH method"/"total pore volume of 1 to 100 nm by DH method"×100.

In the present embodiment, the total pore volume and the pore volume of the carbonaceous material by the DH method can be calculated from the nitrogen adsorption isotherm using a DH (Dollimore-Heal) method. The specific calculation of the total pore volume and the pore volume can be performed by a method described later in [Measurement of Total Pore Volume and Pore Volume by DH Method].

In both the first embodiment and the second embodiment, the shape of the carbonaceous material is not particularly limited, and may be, for example, any shape such as a particulate shape or a fibrous shape (thread-like, woven cloth-like, felt-like). The shape can be appropriately selected according to a specific use aspect. However, a particulate shape is preferable because of its high adsorption performance per unit volume. In the case of a particulate carbonaceous material, the dimension thereof is not particularly limited, and the particle size and the like may be appropriately adjusted according to the specific use aspect.

A raw material (carbonaceous precursor) of the carbonaceous material is not particularly limited. Examples of the carbonaceous precursor include plant-based carbonaceous precursors (for example, materials derived from plants, such as wood, sawdust, charcoal, fruit shell such as coconut or walnut shell, fruit seed, by-product of pulp production, lignin, and waste molasses), mineral-based carbonaceous precursors (for example, materials derived from minerals, such as peat, lignite, brown coal, bituminous coal, anthracite coal, coke, coal tar, coal tar pitch, petroleum distillation residue, and petroleum pitch), synthetic resin-based carbonaceous precursors (for example, materials derived from synthetic resins, such as a phenolic resin, polyvinylidene chloride, and an acrylic resin), and natural fiber-based carbonaceous precursors (for example, materials derived from natural fibers, such as natural fiber (e.g., cellulose) and regenerated fiber (e.g., rayon)). Among them, plant-based carbonaceous precursors are preferable because a carbonaceous material having excellent adsorption performance for a substance to be removed defined in the Household Goods Quality Labeling Act is easily obtained. Thus, in a preferred embodiment, the carbonaceous material is derived from the plant-based carbonaceous precursor. From the viewpoint of achieving a carbonaceous material capable of more efficiently removing chloroform, coconut is preferably used as a raw material. Thus, in a particularly preferred embodiment, coconut is used as the plant-based carbonaceous precursor.

The carbonaceous material of the present embodiment can very efficiently remove chloroform. Therefore, the carbonaceous material of the present embodiment can be suitably used as a carbonaceous material for purifying water (carbonaceous material for water purification), and can be more suitably used as a carbonaceous material for purifying tap water (carbonaceous material for tap water purification).

[Method for Producing Carbonaceous Material]

The carbonaceous material according to the present embodiment is produced by subjecting the carbonaceous precursor described above to activation. When carbonization is required prior to the activation, oxygen or air is usually blocked, and carbonization may be performed at, for example, 400 to 800° C. (preferably 500 to 800° C., and more preferably 550 to 750° C.). In this case, the carbonaceous material is produced by subjecting the raw material carbon obtained by carbonizing the carbonaceous precursor to activation.

A specific production method for obtaining the carbonaceous material in which the specific surface area, the ratio of the pore volume, and the average pore diameter (benzene adsorption amount, total pore volume, and the like as necessary) are within specific ranges is not particularly limited, and the carbonaceous material can be obtained, for example, by a production method including alkali-washing a raw material of the carbonaceous material; and subjecting the raw material to activation using a fluidized bed furnace.

The means for performing the alkali cleaning before the activation is not particularly limited, and examples thereof include a method in which the carbonaceous precursor is charged into an aqueous solution containing an alkali such as sodium hydroxide or potassium hydroxide and immersed in the aqueous solution for about 2 hours to 1 day. After the immersion in the alkali, before the activation, the carbonaceous precursor may be washed with water and/or immersed in an acidic solution for the purpose of removing metals that affect the activation reaction.

Next, the activation is performed, and in the activation in the present embodiment, a fluidized bed furnace (fluidized bed activation furnace) is used as an activation furnace. As a result, it is considered that a carbonaceous material having more excellent chloroform removal performance than that in a conventional method using a rotary kiln as the activation furnace or the like can be obtained.

The activation condition of the carbonaceous precursor is not particularly limited as long as the benzene adsorption amount of the carbonaceous material to be obtained falls within the above-mentioned range. For example, the temperature during activation may be about 800 to 1000° C., and the activation time may be any time during which the benzene adsorption amount (desired degree of progress of activation) is achieved.

When plant-based carbonaceous precursors such as coconut or mineral-based carbonaceous precursors, containing impurities such as alkali metal, alkaline earth metal, and transition metal are used, the carbonaceous material after activation is washed to remove ash and chemicals. Therefore, in one embodiment, the production method of the present invention may include the step of washing the carbonaceous material after activation. In that case, a mineral acid or water is used for washing, and hydrochloric acid having high washing efficiency is preferable as the mineral acid. In the case of washing (pickling) the carbonaceous material using a mineral acid such as hydrochloric acid, it is preferable to perform water washing or the like after pickling to perform a deacidification treatment.

After washing, the obtained carbonaceous material is dried, and pulverized and sieved as necessary, whereby a carbonaceous material product can be obtained.

[Water Purification Filter]

A water purification filter can be produced using the carbonaceous material. Hereinafter, a water purification filter according to a preferred embodiment will be described.

In a preferred embodiment, the water purification filter contains the carbonaceous material according to the present embodiment as described above and a fibrous binder.

The fibrous binder is not particularly limited as long as it can be fibrillated to entangle and shape the carbonaceous material, and can be widely used regardless of synthetic products and natural products. Examples of such fibrous binders include acrylic fibers, polyethylene fibers, polypropylene fibers, polyacrylonitrile fibers, cellulose fibers, nylon fibers, aramid fibers, and pulp. The fiber length of the fibrous binder is preferably 4 mm or less.

The fibrous binders may be used in combination of two or more. Particularly preferably, a polyacrylonitrile fiber or pulp is used as the binder. This can further increase the density of the molded body and the strength of the molded body to suppress deterioration in the performance.

In a preferred embodiment, the water permeability of the fibrous binder is about 10 to 150 mL in terms of a CSF value. In the present embodiment, the CSF value is a value obtained by measurement in accordance with JIS P8121 "Pulps-Determination of Drainability" Canadian Standard Freeness method. The CSF value can be adjusted, for example, by fibrillating the fibrous binder. When the CSF value of the fibrous binder is less than 10 mL, the water permeability cannot be obtained, whereby the strength of the molded body may decrease, and the pressure loss may also increase. Meanwhile, when the CSF value exceeds 150 mL, the powdery activated carbon cannot be sufficiently retained, whereby the strength of the molded body may decrease, and the filter may also have poor adsorption performance.

The water purification filter preferably contains 4 to 10 parts by mass, and more preferably 4.5 to 6 parts by mass of the fibrous binder based on 100 parts by mass of the carbonaceous material from viewpoints of removal performance of a substance to be removed, and moldability and the like. Therefore, in a preferred embodiment, the water purification filter contains the carbonaceous material according to the present embodiment and the fibrous binder. The fibrous binder has a CSF value of 10 to 150 mL, and 4 to 10 parts by mass of the fibrous binder is contained with respect to 100 parts by mass of the carbonaceous material. When the water purification filter contains other functional components to be described later, "with respect to 100 parts by mass of carbonaceous material" as to the filter composition may be read as "with respect to 100 parts by mass of the total of carbonaceous material and other functional components".

The water purification filter may contain other functional components as long as the effect of the present invention is not inhibited. Examples of the other functional components include a lead adsorption material such as titanosilicate or a zeolite-based powder, an ion exchange resin, or a chelating resin capable of adsorbing and removing soluble lead, and various adsorption materials containing a silver ion and/or a silver compound for imparting antibacterial properties.

Since the water purification filter according to the present embodiment contains the carbonaceous material according to the present embodiment, chloroform can be very efficiently removed. The water passing condition is not particularly limited, but the water passing condition is carried out at a space velocity (SV) of 300 to 6500/hr so that the pressure loss does not become extremely large. The performance of the water purification filter can be confirmed by plotting the relationship between each removal rate calculated from the concentration of a substance to be removed in raw water and permeated water and the ratio (cumulative permeated water amount L/mL) of the amount of water (L) allowed to flow from the start of water flow and the volume (mL) of a water purification cartridge.

[Water Purifier]

A water purifier can be produced using the carbonaceous material or the water purification filter. In a preferred embodiment, the water purifier includes the carbonaceous material or the water purification filter according to the present embodiment as described above.

In a preferred embodiment, the water purifier includes a water purification cartridge, and the water purification cartridge is configured using the carbonaceous material or the water purification filter according to the present embodiment. For example, the carbonaceous material according to the present embodiment may be filled in a housing to constitute the water purification cartridge, and the water purification filter according to the present embodiment may be filled in the housing to constitute the water purification cartridge. The water purification cartridge may include, in addition to the carbonaceous material or the water purification filter according to the present embodiment, a combination of known nonwoven fabric filters, various adsorption materials, mineral additives, ceramic filter materials, and hollow fiber membranes and the like.

As described above, the present specification discloses techniques of various aspects, among which main techniques are summarized below.

That is, a carbonaceous material according to one aspect of the present invention has a BET specific surface area calculated from a nitrogen adsorption isotherm by a BET method, of 750 m$^2$/g or more and 1000 m$^2$/g or less, a ratio of a pore volume of pores of 0.3875 to 0.9125 nm calculated from the nitrogen adsorption isotherm by a HK method to a total pore volume calculated from the nitrogen adsorption isotherm by the HK method, of 80% or more, and an average pore diameter obtained by the following formula using the BET specific surface area and the total pore volume calculated from the nitrogen adsorption isotherm by the HK method, of 1.614 nm or less:

$$D = 4000 \times V/S$$

wherein D represents the average pore diameter (nm), V represents the total pore volume (mL/g), and S represents the specific surface area (m$^2$/g).

The carbonaceous material preferably has a benzene adsorption amount of 20% by weight or more and 28% by weight or less.

Furthermore, in the carbonaceous material, the total pore volume calculated by the HK method is 0.400 mL/g or less.

In the carbonaceous material, the pore volume of pores of 0.3875 to 0.9125 nm calculated by the HK method is preferably 0.250 mL/g or more and 0.350 mL/g or less.

A carbonaceous material according to another aspect of the present invention has a benzene adsorption amount of 20% by weight or more and 28% by weight or less, and an average pore diameter obtained by the following formula using a BET specific surface area calculated by a BET method from a nitrogen adsorption isotherm and a total pore volume calculated by a carbon dioxide gas adsorption DFT method, of 1.300 to 1.600 nm:

$$D = 4000 \times V/S$$

wherein D represents the average pore diameter (nm), V represents the total pore volume (mL/g), and S represents the specific surface area (m$^2$/g).

In the carbonaceous material according to another aspect, the total pore volume calculated by a carbon dioxide gas adsorption DFT method is preferably 0.400 mL/g or less.

Furthermore, in the carbonaceous material according to another aspect, a pore volume of pores of 0.4 to 0.7 nm calculated by a carbon dioxide gas adsorption DFT method is preferably 0.140 to 0.175 mL/g.

In the carbonaceous material according to another aspect, a ratio of a pore volume of pores of 0.4 to 0.7 nm to the total pore volume calculated by the carbon dioxide gas adsorption DFT method is preferably 0.535 or less.

Furthermore, in the carbonaceous material according to another aspect, the BET specific surface area is preferably 1000 m$^2$/g or less.

The carbonaceous materials are preferably derived from a plant-based carbonaceous precursor. Furthermore, the plant-based carbonaceous precursor is preferably coconut.

A method for producing the carbonaceous material according to still another aspect of the present invention, the method includes: alkali-washing a raw material of the carbonaceous material; and subjecting the raw material to activation using a fluidized bed furnace.

A water purification filter according to yet still another aspect of the present invention contains the carbonaceous material and a fibrous binder, wherein the fibrous binder has a CSF value of 10 to 150 mL; and 4 to 10 parts by mass of the fibrous binder is contained with respect to 100 parts by mass of the carbonaceous material.

The present invention further includes a water purifier including the carbonaceous material and a water purifier including the water purification filter.

EXAMPLES

Hereinafter, the present invention will be specifically described with reference to Examples, but the present invention is not limited thereto.

Test 1: Evaluation Method

Physical property values in Examples were measured by the following methods.

[Measurement of Benzene Adsorption Amount]

Carbonaceous materials prepared in Examples and Comparative Examples were dried in a constant temperature dryer at 115° C. for 3 hours, and then left to cool to room temperature in a desiccator using silica gel as a desiccant. Next, in a thermostatic chamber at 20° C., benzene-containing dry air having a concentration of $\frac{1}{10}$ of a saturated concentration was caused to pass through the carbonaceous material. From the weight of the carbonaceous material that reached the adsorption equilibrium and the weight of the carbonaceous material before adsorption (that is, the weight of the carbonaceous material after drying and cooling), a benzene adsorption amount (% by weight) was determined according to the following formula (1).

Adsorption amount of benzene (% by weight)=[{ (Sample weight after benzene adsorption)− (Sample weight before benzene adsorption)}/ (Sample weight before benzene adsorption)]× 100    [Formula (1)]

[Measurement of Nitrogen Adsorption Isotherm]

Using BELSORP-MAX manufactured by MicrotracBEL Corp., the carbonaceous material was heated under reduced pressure (degree of vacuum: 0.1 kPa or less) at 300° C. for 5 hours, and the nitrogen adsorption isotherm of the carbonaceous material was then measured at 77 K.

[Measurement of Specific Surface Area]

The nitrogen adsorption isotherm obtained by the above method was analyzed by a multi-point BET method, and a specific surface area was calculated from a straight line in a region of relative pressure P/P=0.01 to 0.1 on the obtained curve.

[Total Pore Volume (HK Method)]

The nitrogen adsorption isotherm was analyzed by the HK method. As analysis conditions, an adsorbent molecular weight was 28.010, an adsorbent density was 0.808 g/cm$^3$, a file data interpolation method was linear, and a parameter setting was N2-C(77K).HKS.

[Measurement of Average Pore Diameter]

Using the specific surface area and the total pore volume obtained above, an average pore diameter was calculated by the following formula.

$$D=4000 \times V/S$$

(wherein D represents the average pore diameter (nm). V represents the total pore volume (mL/g), and S represents the specific surface area (m$^2$/g)).

[Pore Volume of 0.3875 to 0.9125 nm (HK Method)]

The nitrogen adsorption isotherm obtained by the above-described method was analyzed by the HK method to calculate a pore volume of P/P$_0$ of 4.5902×10^(−8) to 7.4189×10^(−3) (corresponding to pores of 0.3875 to 0.9125 nm).

[Ratio of Pore Volume of 0.3875 to 0.9125 nm to Total Pore Volume]

The pore volume of 0.3875 to 0.9125 nm calculated by the HK method was divided by the total pore volume calculated by the HK method to obtain a ratio of the pore volume of 0.3875 to 0.9125 nm to the total pore volume.

[Total Pore Volume (MP Method)]

Using BELSORP-MAX manufactured by MicrotracBEL Corp. the carbonaceous material was heated under reduced pressure (degree of vacuum: 0.1 kPa or less) at 300° C. for 5 hours, and the nitrogen adsorption isotherm of the carbonaceous material was then measured at 77 K.

The MP method was applied to the nitrogen adsorption isotherm obtained by the above method to calculate the pore volume of micropores. In the analysis by the MP method, a reference curve 'NGCB-BEL.t' provided by MicrotracBEL Corp. was used.

[Pore Volume of 0.6 nm or Less (MP Method)]

In the pore diameter and the integrated pore volume analyzed by the MP method, $V_{0.6}$ was calculated from an integrated pore volume $V_{0.42}$ up to 0.42 nm and an integrated pore volume $V_{0.7}$ up to 0.7 nm according to the following formula.

$$a=(V_{0.7}-V_{0.42})/0.28$$

$$b=V_{0.7}-(V_{0.7}-V_{0.42})\times 0.7/0.28$$

$$V_{0.6}=0.6a+b$$

[Ratio of Pore Volume of 0.6 nm or Less to Total Pore Volume (MP Method)]

The pore volume of 0.6 nm or less calculated by the MP method was divided by the total pore volume calculated by the MP method and multiplied by 100 to obtain a ratio (%) of the pore volume of 0.6 nm or less to the total pore volume.

[Total Pore Volume of 1 to 100 nm (DH Method)]

An adsorption/desorption isotherm was obtained by measuring adsorption/desorption of nitrogen at 77 K at a relative pressure (p/p0) from 1.0×10^(−7) to 0.99 using a gas adsorption measuring apparatus (AUTOSORB-iQ MP-XR manufactured by Quantachrome Instruments). The obtained adsorption isotherm was analyzed by the DH method using data between 0.001 and 0.99 for (p/p0) to calculate a pore volume and pore diameter distribution from a diameter of 1 nm to a diameter of 100 nm. The pore volume from 1 nm in diameter to 100 nm in diameter was defined as the total pore volume of 1 to 100 nm.

[Pore Volume of 2 nm or Less (DH Method)]

A pore volume of 2 nm or less was calculated from the data of the pore diameter distribution by the DH method described above.

[Ratio of Pore Volume of 2 nm or Less to Total Pore Volume (1 to 100 nm) (DH Method)]

The pore volume of 2 nm or less calculated by the DH method was divided by the total pore volume (1 to 100 nm) calculated by the DH method, and multiplied by 100 to obtain a ratio (%) of the pore volume of 2 nm or less to the total pore volume.

Examples 1 to 5 and Comparative Examples 1 and 2

The coconut carbon carbonized at 400 to 600° C. was subjected to particle size adjustment of 22 mesh (0.710 mm)

to 50 mesh (0.300 mm) by a JIS standard sieve. 500 g of the coconut carbon was charged into 1 L of a 0.1N—NaOH aqueous solution, immersed overnight, dehydrated, charged into 1 L of a 0.1N—HCl aqueous solution, and then immersed overnight. Thereafter, the mixture was dehydrated, washed with 1 L of water five times, and dried in the sun.

The raw material (coconut carbon) thus obtained was subjected to activation in propane combustion gas with a water vapor volume ratio of 40% at 900° C. in a fluidized bed furnace at different times so that benzene adsorption amounts were set to values shown in Table 1. Thereafter, the raw material was washed with acid and dried using a 0.1 N hydrochloric acid solution, and subjected to particle size adjustment of 30 mesh (0.500 mm) to 60 mesh (0.250 mm) using a JIS standard sieve to obtain activated carbons (carbonaceous materials) of Examples 1 to 5 and Comparative Examples 1 and 2. The physical property values of the obtained carbonaceous materials are shown in Table 1 described later.

Comparative Examples 3 and 4

The coconut carbon carbonized at 400 to 600° C. was subjected to particle size adjustment of 3.5 mesh (5.600 mm) to 5.5 mesh (3.350 mm) by a JIS standard sieve. The coconut carbon was subjected to activation using a rotary kiln under the conditions of 900° C., a water vapor volume ratio of 40%, and a gas amount of 5.5 L/min at different times so that benzene adsorption amounts were set to values shown in Table 1. Thereafter, 500 g of the obtained activated product was charged into 1 L of a 0.1 N hydrochloric acid solution, left to stand overnight, dehydrated, washed with 1 L of water five times, dried, crushed, and subjected to particle size adjustment of 30 mesh (0.500 mm) to 60 mesh (0.250 mm) by a JIS standard sieve, thereby obtaining (carbonaceous materials) of Comparative Examples 3 and 4. The physical property values of the obtained carbonaceous materials are shown in Table 1 described later.

Comparative Examples 5 and 6

The coconut carbon carbonized at 400 to 600° C. was subjected to particle size adjustment of 22 mesh (0.710 mm) to 50 mesh (0.300 mm) by a JIS standard sieve. The coconut carbon was subjected to activation using a rotary kiln under the conditions of 900° C., a water vapor volume ratio of 40%, and a gas amount of 5.5 L/min at different times so that benzene adsorption amounts were set to values shown in Table 1. Thereafter, 500 g of the obtained activated product was charged into 1 L of a 0.1 N hydrochloric acid solution, left to stand overnight, dehydrated, washed with 1 L of water five times, dried, and subjected to particle size adjustment by a JIS standard sieve of 30 mesh (0.500 mm) to 60 mesh (0.250 mm), thereby obtaining (carbonaceous materials) of Comparative Examples 5 and 6. The physical property values of the obtained carbonaceous materials are shown in Table 1 described later.

<Evaluation Test>

(Chloroform Adsorption Performance and Adsorption Rate)

To 100 mL of a chloroform solution adjusted to an initial concentration of about 0.100 mg/L. any amount of activated carbon pulverized so as to have a particle size of about 20 μm was added, followed by stirring at about 20° C. for 10 minutes and 120 minutes. An adsorption amount was calculated from a chloroform concentration in each solution obtained by pressure-filtering the solution with MF (syringe filter).

As a specific calculation method, an adsorption amount A was determined by the following formula from the chloroform concentration Co (mg/L) of a blank to which activated carbon was not added, the chloroform concentration C (mg/L) of test water obtained by adding the activated carbon and filtering, and the weight W (mg) of the activated carbon added. The chloroform concentration was determined by a headspace method using ECD gas chromatography.

$$A=(Co-C)\times 1000\times 0.1/W$$

Furthermore, a power approximate expression was calculated from the adsorption amount A of each of the obtained three points having different test water concentrations. An adsorption amount at a test water concentration of 0.01 mg/L was calculated. An adsorption amount during stirring for 10 minutes and an adsorption amount during stirring for 120 minutes were obtained.

The case where the adsorption amount at a concentration of 0.01 mg/L was 1.00 mg/g or more during stirring for 120 minutes, and the ratio of the adsorption amount during stirring for 10 minutes to the adsorption amount during stirring for 120 minutes is 0.82 or more was determined as pass.

As the adsorption amount during stirring for 120 minutes is higher, chloroform removing ability is higher. As the ratio of the adsorption amount during stirring for 10 minutes to the adsorption amount during stirring for 120 minutes is higher, the adsorption rate is faster. That is, higher adsorption performance is exhibited in a short contact time, and a higher adsorption rate means higher performance.

(Water Passing Test)

Activated carbon of each of Examples and Comparative Examples was filled in a resin column having an inner diameter of 33 mm, a height of 70 mm, and a volume of 60 mL. Water was allowed to pass through the column under conditions of a raw water concentration of 20±3° C., a raw water concentration of 0.300 mg/L, a filtration flow rate of 0.3 L/min (SV=300), and downflow in accordance with the NSF (National Science Foundation) concentration standard. When a point of a removal rate of 95% was defined as a breakthrough point, 600 L or more was determined as pass. The present test is assumed to be used for water purification, and a higher integrated flow rate until breakthrough provides a longer life, which can be said to provide higher performance.

The above results are summarized in Table 1.

TABLE 1

| | Physical properties of carbonaceous materials | | | | | | | |
|---|---|---|---|---|---|---|---|---|
| Unit | Benzene adsorption amount wt % | Specific surface area m²/g | HK method Total pore volume mL/g | Average pore diameter nm | Pore volume of 0.3875 to 0.9125 nm mL/g | Pore volume ratio % | MP method Total pore volume mL/g | MP method Pore volume of 0.6 nm or less mL/g |
| Example 1 | 22.5 | 857 | 0.3417 | 1.595 | 0.2778 | 81.3 | 0.3633 | 0.1697 |
| Example 2 | 24.2 | 909 | 0.3633 | 1.599 | 0.2951 | 81.2 | 0.3882 | 0.1777 |
| Example 3 | 24.1 | 869 | 0.3477 | 1.600 | 0.2827 | 81.3 | 0.3723 | 0.1698 |
| Example 4 | 25.9 | 948 | 0.3812 | 1.608 | 0.3092 | 81.1 | 0.4064 | 0.1831 |
| Example 5 | 26.6 | 977 | 0.3939 | 1.613 | 0.3176 | 80.6 | 0.4196 | 0.1883 |
| Comparative Example 1 | 28.9 | 1050 | 0.4247 | 1.618 | 0.3413 | 80.4 | 0.4520 | 0.1956 |
| Comparative Example 2 | 30.2 | 1099 | 0.4453 | 1.621 | 0.3566 | 80.1 | 0.4734 | 0.1994 |
| Comparative Example 3 | 24.8 | 960 | 0.3607 | 1.503 | 0.2878 | 79.8 | 0.3821 | 0.1720 |
| Comparative Example 4 | 26.7 | 954 | 0.3849 | 1.614 | 0.3059 | 79.5 | 0.4065 | 0.1764 |
| Comparative Example 5 | 23.1 | 955 | 0.3289 | 1.378 | 0.2608 | 79.3 | 0.3488 | 0.1622 |
| Comparative Example 6 | 24.9 | 896 | 0.3606 | 1.610 | 0.2840 | 78.8 | 0.3794 | 0.1711 |

| | Physical properties of carbonaceous materials | | | | Evaluation results | | |
|---|---|---|---|---|---|---|---|
| | MP method | DH method | DH method | DH method | | | |
| Unit | 0 6 nm or less/Total pore volume % | Total pore volume of 1 to 100 nm mL/g | Pore volume of 2 nm or less mL/g | 2 nm or less/Total pore volume % | 120 min Adsorption amount mg/g | Adsorption rate — | Water passing performance L |
| Example 1 | 46.7 | 0.0939 | 0.0637 | 67.8 | 1.28 | 0.828 | 690 |
| Example 2 | 45.8 | 0.1063 | 0.0724 | 68.2 | 1.16 | 0.966 | 700 |
| Example 3 | 45.6 | 0.1036 | 0.0691 | 66.7 | 1.65 | 1.00 | 610 |
| Example 4 | 45.1 | 0.1176 | 0.0815 | 69.3 | 1.49 | 0.946 | 610 |
| Example 5 | 44.9 | 0.1223 | 0.0852 | 69.7 | 1.01 | 0.842 | 600 |
| Comparative Example 1 | 43.3 | 0.1423 | 0.1006 | 70.7 | 0.86 | 0.791 | 560 |
| Comparative Example 2 | 42.1 | 0.1547 | 0.1105 | 71.4 | 0.81 | 0.827 | 540 |
| Comparative Example 3 | 45.0 | 0.1123 | 0.0800 | 71.2 | 1.52 | 0.809 | 470 |
| Comparative Example 4 | 43.4 | 0.1288 | 0.0937 | 72.7 | 1.25 | 0.888 | 480 |
| Comparative Example 5 | 46.5 | 0.0950 | 0.0669 | 70.5 | 1.60 | 0.869 | 430 |
| Comparative Example 6 | 45.1 | 0.1132 | 0.0811 | 71.6 | 1.44 | 0.813 | 460 |

(Discussion)

As is apparent from the results in Table 1, all of the carbonaceous materials of Examples according to the present invention were found to exhibit very high chloroform removal performance and have a long life. Furthermore, it could be confirmed that the carbonaceous materials can have a high adsorption rate to chloroform and exhibit excellent chloroform removal performance in the water purification application.

Meanwhile, the carbonaceous materials of Comparative Examples 1 to 6 in which at least any of the specific surface area, the ratio of the pore volume of 0.3875 to 0.9125 nm to the total pore volume, and the average pore diameter did not satisfy the requirements of the present invention did not exhibit sufficient chloroform removal performance or had poor water passing performance.

Test 2: Evaluation Method

For the carbonaceous materials of Examples 1 to 5 and Comparative Examples 1 to 6, the following physical properties were measured by methods described later.

[Measurement of Benzene Adsorption Amount]

Measurement was performed in the same manner as in the Test 1.

[Measurement of Nitrogen Adsorption Isotherm]

Measurement was performed in the same manner as in the Test 1.

[Measurement of Specific Surface Area]

Measurement was performed in the same manner as in the Test 1.

[Measurement of Carbon Dioxide Adsorption/Desorption Isotherm]

An adsorption/desorption isotherm was obtained by measuring adsorption/desorption of carbon dioxide at 273 K at a relative pressure (p/p0) of 0.00075 to 0.030 using a gas adsorption measuring apparatus (AUTOSORB-iQ MP-XR manufactured by Quantachrome Instruments).

[Total Pore Volume (DFT Method)]

The carbon dioxide adsorption/desorption isotherm obtained by the above-described method was analyzed by an NLDFT method using "$CO_2$ at 273 K on carbon (NLDFT model)" as a calculation model, to obtain pore diameter distribution. A volume in a pore diameter range of 0.3 to 1.48 nm was calculated, and taken as a total pore volume.

[Pore Volume of 0.4 to 0.7 nm (DFT Method)]

The carbon dioxide adsorption/desorption isotherm obtained by the above-described method was analyzed by an NLDFT method using "$CO_2$ at 273 K on carbon (NLDFT model)" as a calculation model, to obtain pore diameter distribution. A pore volume of pores having a pore diameter of 0.4 to 0.7 nm was calculated.

[Ratio of Pore Volume of 0.4 to 0.7 nm to Total Pore Volume]

The pore volume of 0.4 to 0.7 nm calculated by the DFT method was divided by the total pore volume calculated by the DFT method to obtain a ratio of the pore volume of 0.4 to 0.7 nm to the total pore volume.

[Total Pore Volume (MP Method), Pore Volume of 0.6 nm or Less (MP Method), and Ratios Thereof]

Measurement was performed in the same manner as in the Test 1.

[Total Pore Volume of 1 to 100 nm (DH Method), Pore Volume of 2 nm or Less (DH Method), and Ratios Thereof]

Measurement was performed in the same manner as in the Test 1.

[Measurement of Average Pore Diameter]

Using the specific surface area and the total pore volume obtained above, an average pore diameter was calculated by the following formula:

$$D = 4000 \times V/S$$

(wherein D represents the average pore diameter (nm), V represents the total pore volume (mL/g), and S represents the specific surface area ($m^2/g$).).

The values of the respective physical properties are shown in Table 2.

Furthermore, evaluation methods of the chloroform adsorption performance, the adsorption rate, and the water passing test were performed in the same manner as in the Test 1.

The above results are summarized in Table 2.

TABLE 2

| | Physical properties of carbonaceous materials | | | | | | | |
|---|---|---|---|---|---|---|---|---|
| Unit | Benzene adsorption amount wt % | Specific surface area $m^2/g$ | DFT method Total pore volume mL/g | Pore volume of 0.4 to 0.7 nm mL/g | Pore volume of 0.4 to 0.7 nm/Total pore volume — | Average pore diameter nm | MP method Total pore volume mL/g | MP method Pore volume of 0.6 nm or less mL/g |
| Example 1 | 22.5 | 857 | 0.3163 | 0.1597 | 0.505 | 1.476 | 0.3633 | 0.1697 |
| Example 2 | 24.2 | 909 | 0.3128 | 0.1646 | 0.526 | 1.376 | 0.3882 | 0.1777 |
| Example 3 | 24.1 | 869 | 0.3225 | 0.1539 | 0.477 | 1.484 | 0.3723 | 0.1698 |
| Example 4 | 25.9 | 948 | 0.3718 | 0.1656 | 0.445 | 1.569 | 0.4064 | 0.1831 |
| Example 5 | 26.6 | 977 | 0.3297 | 0.1594 | 0.483 | 1.350 | 0.4196 | 0.1883 |
| Comparative Example 1 | 28.9 | 1050 | 0.2963 | 0.1706 | 0.576 | 1.129 | 0.4520 | 0.1956 |
| Comparative Example 2 | 30.2 | 1099 | 0.3446 | 0.1684 | 0.489 | 1.254 | 0.4734 | 0.1994 |
| Comparative Example 3 | 24.8 | 960 | 0.3078 | 0.1590 | 0.517 | 1.283 | 0.3821 | 0.1720 |
| Comparative Example 4 | 26.7 | 954 | 0.3057 | 0.1622 | 0.531 | 1.282 | 0.4065 | 0.1764 |
| Comparative Example 5 | 23.1 | 955 | 0.2652 | 0.1524 | 0.575 | 1.111 | 0.3488 | 0.1622 |
| Comparative Example 6 | 24.9 | 896 | 0.2908 | 0.1561 | 0.537 | 1.298 | 0.3794 | 0.1711 |

| | MP method | DH method | DH method | DH method | Evaluation results | | |
|---|---|---|---|---|---|---|---|
| Unit | 0.6 nm or less/Total pore volume % | Total pore volume of 1 to 100 nm mL/g | Pore volume of 2 nm or less mL/g | 2 nm or less/Total pore volume % | 120 min Adsorption amount mg/g | Adsorption rate — | Water passing performance L |
| Example 1 | 46.7 | 0.0939 | 0.0637 | 67.8 | 1.28 | 0.828 | 690 |
| Example 2 | 45.8 | 0.1063 | 0.0724 | 68.2 | 1.16 | 0.966 | 700 |
| Example 3 | 45.6 | 0.1036 | 0.0691 | 66.7 | 1.65 | 1.00 | 610 |
| Example 4 | 45.1 | 0.1176 | 0.0815 | 69.3 | 1.49 | 0.946 | 610 |
| Example 5 | 44.9 | 0.1223 | 0.0852 | 69.7 | 1.01 | 0.842 | 600 |
| Comparative Example 1 | 43.3 | 0.1423 | 0.1006 | 70.7 | 0.86 | 0.791 | 560 |
| Comparative Example 2 | 42.1 | 0.1547 | 0.1105 | 71.4 | 0.81 | 0.827 | 540 |
| Comparative Example 3 | 45.0 | 0.1123 | 0.0800 | 71.2 | 1.52 | 0.809 | 470 |

TABLE 2-continued

| | | | | | | | |
|---|---|---|---|---|---|---|---|
| Comparative Example 4 | 43.4 | 0.1288 | 0.0937 | 72.7 | 1.25 | 0.888 | 480 |
| Comparative Example 5 | 46.5 | 0.0950 | 0.0669 | 70.5 | 1.60 | 0.869 | 430 |
| Comparative Example 6 | 45.1 | 0.1132 | 0.0811 | 71.6 | 1.44 | 0.813 | 460 |

This application is based on Japanese Patent Application Nos. 2020-112667 and 2020-112668 filed on Jun. 30, 2020, the contents of which are included in the present application.

The present invention has been appropriately and sufficiently explained above by way of the embodiments while referring to the specific examples described above, for the purpose of illustrating the invention. A person skilled in the art should recognize, however, that the embodiments described above can be easily modified and/or improved. Therefore, it is understood that any modified embodiments or improved embodiments conducted by a person skilled in the art are encompassed within the scope as claimed in the appended claims, so long as these modifications and improvements do not depart from the scope of the claims.

INDUSTRIAL APPLICABILITY

The carbonaceous material of the present invention is particularly useful for removing substances to be removed in the Household Goods Quality Labeling Act. Therefore, the present invention has wide industrial applicability in water purification technologies such as a water purification filter and a water purifier.

The invention claimed is:

1. A carbonaceous material having:
   a BET specific surface area calculated from a nitrogen adsorption isotherm by a BET method, of 750 m²/g or more and 1000 m²/g or less,
   a ratio of a pore volume of pores of 0.3875 to 0.9125 nm calculated from the nitrogen adsorption isotherm by a HK method to a total pore volume calculated from the nitrogen adsorption isotherm by the HK method, of 80% or more, and
   an average pore diameter obtained by the following formula using the BET specific surface area and the total pore volume calculated from the nitrogen adsorption isotherm by the HK method, of 1.614 nm or less:
   $$D = 4000 \times V/S$$
   wherein D represents the average pore diameter expressed in nm, V represents the total pore volume expressed in mL/g, and S represents the specific surface area expressed in m²/g.

2. The carbonaceous material according to claim 1, wherein the carbonaceous material has a benzene adsorption amount of 20% by weight or more and 28% by weight or less.

3. The carbonaceous material according to claim 1, wherein the total pore volume calculated by the HK method is 0.400 mL/g or less.

4. The carbonaceous material according to claim 1, wherein the pore volume of pores of 0.3875 to 0.9125 nm calculated by the HK method is 0.250 mL/g or more and 0.350 mL/g or less.

5. The carbonaceous material according to claim 1, wherein the carbonaceous material is derived from a plant-based carbonaceous precursor.

6. The carbonaceous material according to claim 5, wherein the plant-based carbonaceous precursor is coconut.

7. A water purification filter, comprising
   the carbonaceous material according to claim 1 and a fibrous binder,
   wherein
   the fibrous binder has a CSF value of 10 to 150 mL; and
   4 to 10 parts by mass of the fibrous binder is contained with respect to 100 parts by mass of the carbonaceous material.

8. A water purifier, comprising
   the carbonaceous material according to claim 1.

9. A water purifier, comprising
   the water purification filter according to claim 7.

* * * * *